(12) United States Patent
Proctor et al.

(10) Patent No.: US 7,904,402 B2
(45) Date of Patent: Mar. 8, 2011

(54) PLUGGABLE DIALECTS FOR A RULE ENGINE

(75) Inventors: Mark Proctor, London (GB); Edson Tirelli, São Paulo (BR)

(73) Assignee: Red Hat, Inc., Raleigh, NC (US)

( * ) Notice: Subject to any disclaimer, the term of this patent is extended or adjusted under 35 U.S.C. 154(b) by 811 days.

(21) Appl. No.: 11/897,608

(22) Filed: Aug. 31, 2007

(65) Prior Publication Data
US 2009/0063382 A1    Mar. 5, 2009

(51) Int. Cl.
G06F 17/00 (2006.01)
G06N 5/02 (2006.01)

(52) U.S. Cl. .................. 706/45; 706/46; 706/47
(58) Field of Classification Search .............. None
See application file for complete search history.

(56) References Cited

U.S. PATENT DOCUMENTS

| | | | | |
|---|---|---|---|---|
| 7,020,869 B2 * | 3/2006 | Abrari et al. | ............. | 717/108 |
| 7,603,358 B1 * | 10/2009 | Anderson et al. | ............. | 1/1 |
| 2006/0129978 A1 * | 6/2006 | Abrari et al. | ............. | 717/110 |

OTHER PUBLICATIONS

Simic, G., "The Multi-courses Tutoring System Design", ComSIS vol. 1, No. 1, pp. 141-155, Feb. 2004.*
Lubell et al., J., "Implementing XML Schema Naming and Design Rules", Extreme Markup Languages 2006, pp. 1-17, Aug. 7-11, 2006.*
Nagl et al., "ViDRE—A Distributed Service-Oriented Business Rule Engine based on RuleML", EDOC '06, pp. 1-10, 2006.*
Wagner et al., G., "A Usable Interchange Format for Rich Syntax Rules Integrating OCL, RuleML and SWRL", WWW2006, pp. 1-8, May 22-26, 2006.*
Base Semantic Module, Syntax Guide. http://legacy.drools.codehaus.org/Base+Semantic+Module?print=1. Aug. 8, 2007, 4 pages.
Java Semantic Module, XML Syntax. http://legacy.drools.codehaus.org/Java+semantic+module?print=1. Aug. 8, 2007, 3 pages.
Groovy Semantic Module, XML Syntax. http://legacy.drools.codehaus.org/Groovy+Semantic+Module?print=1. Aug. 8, 2007, 3 pages.
Proctor, M., "JBoss Drools 4.0 Released", accessed at: http://blog.athico.com/2007/07/jboss-drools-40-released.html on Jul. 28, 2010, last updated Jul. 25, 2007, 6 pages.
Proctor, M., "Pluggable Dialects for Drools Processes now work :)", accessed at: http://blog.athico.com/2007/11/pluggable-dialects-for-drools-processes.html on Jul. 28, 2010, last updated Nov. 27, 2007, 6 pages.
Proctor, M., "Why the MVEL scipting language for JBoss Rules", accessed at: http://blog.athico.com/2007/05/why-mvel-sciptin-language-for-jboss.html on Jul. 28, 2010, last updated May 21, 2007, 6 pages.
"JBOSS Rules", published Apr. 2007, 4 pages.
McWhirter, B., et al., "Current Core Committers", 2004, 25 pages.

* cited by examiner

*Primary Examiner* — Michael B. Holmes
*Assistant Examiner* — Adrian L Kennedy
(74) *Attorney, Agent, or Firm* — Blakely, Sokoloff, Taylor & Zafman LLP (57) ABSTRACT

Some embodiments of pluggable dialects for a rule engine have been presented. In one embodiment, a rule file substantially written in a rule language is compiled. The rule file may include a set of rules, each rule having one or more semantic code blocks written in a dialect different from the rule language. Further, each rule may include a dialect parameter indicative of the dialect. The compiled rule file is input to a core engine of a rule engine for execution.

20 Claims, 6 Drawing Sheets

Example 1: a DRL rule using Java dialect:
Rule "A sample DRL rule using Java dialect"
    dialect "java"
when
    Person ( $name : name)
    $m : Map()
then
    $m.put( "name", $name);

end

FIG. 1A

Example 2: a DRL rule using MVEL dialect:
Rule "A sample DRL rule using MVEL dialect"
    dialect "mvel"
when
    Person ( $name : name)
    $m : Map()
then
    $m.put( "name", $name);

end

PLUGGABLE DIALECTS FOR A RULE ENGINE

TECHNICAL FIELD

Embodiments of the present invention relate to artificial intelligence, and more specifically to rule engines.

BACKGROUND

Artificial Intelligence (A.I.) is a very broad research area that focuses on "making computers think like people" and includes disciplines like neural networks, genetic algorithms, decision trees, frame systems, and expert systems. Knowledge representation is the area of A.I. concerned with how knowledge is represented and manipulated. Expert systems use knowledge representation to facilitate the codification of knowledge into a knowledge-base, which can be used for reasoning, i.e., this knowledge-base is operable to process data to infer conclusions. Expert systems are also known as knowledge-based systems and knowledge-based expert systems and are considered applied artificial intelligence. Some expert systems use rule engines to apply rules to data.

Generally speaking, a rule is a logical construct for describing the operations, definitions, conditions, and/or constraints that apply to some predetermined data to achieve a goal. For example, a business rule might state that no credit check is to be performed on return customers.

Typically, a rule engine includes a suite of software modules or components that manages and automates the rules to implement the expert system. For instance, the rule engine evaluates and fires one or more of the rules based on the evaluation.

In general, rules are written in rule languages. Many conventional rule engines in general support their own rule language. For example, C Library Integrated Production System (CLIPS) engine supports CLIPS language, Jess engine supports a CLIPS-like language, ILOG JRules supports ILOG Rule Language (IRL), etc. One conventional rule engine, Drools 2.x supports a different version of Drool's Rule Language (DRL), as well as Groovy, Java, and Python through the use of semantic modules. When using a Groovy semantic module, the entire rule, which includes parameters, conditions, and consequence, is written in Groovy. Likewise, when using Java Annotations semantic module, the rule would be a Java class, whose methods would be the conditions and consequences of the rule. Thus, rules in a rule file are conventionally written in a single rule language.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of pluggable dialects for a rule engine. As mentioned above, a rule is substantially written in a rule language. However, in some embodiments, the rule may include or embed a semantic code block written in a non-rule language, such as a programming language or a scripting language. In the following discussion, the non-rule language is referred to as a dialect. In one embodiment, a rule file written in a rule language is compiled. The rule file may include a set of rules, each rule having a semantic code block written in a dialect different from the rule language. The compiled rule file is input to a core engine of a rule engine for execution. More details of some embodiments of the pluggable dialects are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

As mentioned above, a rule generally is a logical construct for describing the operations, definitions, conditions, and/or constraints that apply to some predetermined data to achieve a goal. In some embodiments, a rule is in the form of a two-part structure with a Left Hand Side (LHS) and a Right Hand Side (RHS). Further, a rule may have additional attributes, such as salience, agenda group, auto-focus, activation group, no-loop, duration, etc. In some embodiments, the LHS of a rule includes Conditional Elements (CEs) and Patterns, which are used to facilitate the encoding of propositional and first order logic. The term Pattern is used to indicate Constraints on a fact type. Some examples of CEs include and, or, not, exist, forall, accumulate, etc. Some examples of Constraints include Literal Constraint, Bound Variable Constraint, Return Value, Predicate, etc.

As facts are asserted and modified in a working memory, a rule engine matches the facts against the LHS conditions of the rules. When all the LHS conditions of a rule are met and determined to be true, the rule and those matched facts are activated. When a rule is activated, the rule is placed onto an agenda of a rule engine for potential execution, where the Actions of the RHS of the rule, called the Consequence, are executed. Thus, the RHS of the rule may also be referred to as a consequence block.

The language in which rules are written in is referred to as a rule language. Some examples of a rule language include Drool's Rule Language (DRL), Extensible Markup Language (XML), C Library Integrated Production System (CLIPS) language, etc.

In some embodiments, a rule further includes a semantic code block (or simply referred to as a semantic block) written in a dialect different than the rule language. For instance, a rule written in DRL may use a semantic block written in Java dialect to define its consequence block. Alternatively, the rule may use a semantic block written in MVFLEX Expression Language (MVEL) to define its consequence block. In some embodiments, a rule may use other CEs that contain semantic blocks to define its CEs (e.g., eval( ), accumulate( ), etc.). Note that the use of dialect to define one or more blocks within a rule is orthogonal to the rule language choice, and as such, a user may use any combination of rule language and dialect to compose rules. This approach provides great convenience and flexibility to the user because the user may readily incorporate a block of code in a dialect different from the rule language into the rule. For example, the user may switch to using XML as a rule language and still use Java or MVEL as the dialect for semantic code blocks.

Furthermore, the above feature allows the selection of the dialect with rule level granularity. In other words, a single rule file can contain multiple rules, while each rule may use a different dialect, at the discretion of the user. For instance, a rule file may contain both rules 1010 and 1020 shown in FIGS. 1A and 1B, respectively.

Figure 1A:
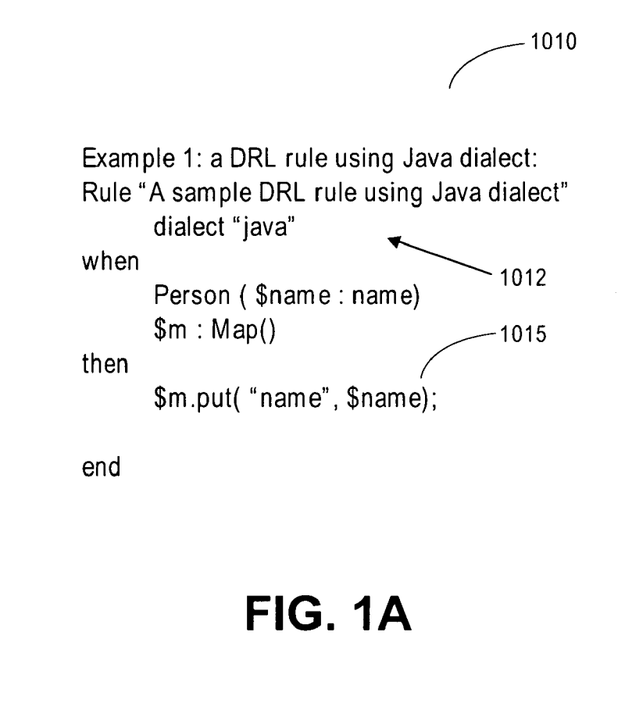
FIGS. 1A and 1B illustrate some embodiments of rules including semantic code blocks.
Figure 1B:
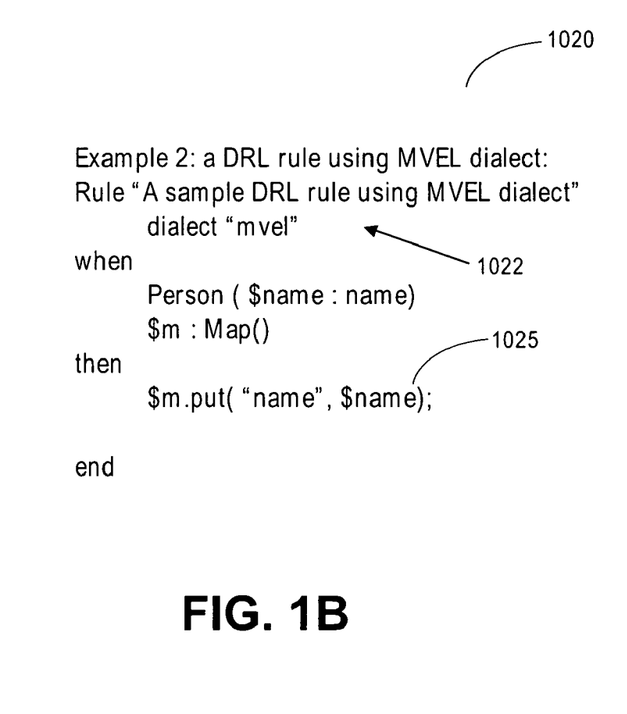

In FIGS. 1A and 1B, respectively, both rules 1010 and 1020 are written using the same rule language, DRL, but the consequence semantic blocks 1015 and 1025 are written using different dialects, Java and MVEL, respectively. The rules 1010 and 1020 include dialect parameters 1012 and 1022, respectively, to indicate the dialect used in their corresponding semantic blocks 1015 and 1025, respectively.

In some embodiments, the rule file containing the rules 1010 and 1020 is embodied in a machine-readable storage medium (e.g., RAM, ROM, CD-ROM, flash memory, etc.). A rule engine implemented on a computer system (e.g., the computer system 700 shown in FIG. 7) may access or read the rule file from the machine-readable storage medium to process the rules 1010 and 1020. Details of some embodiments of the rule engine and how the rule engine processes rules are discussed below.

In some embodiment, a rule engine has two main parts, namely authoring and runtime. Authoring involves the preprocessing of rule files to generate packages, which are loaded into a runtime of the rule engine. The runtime of the rule engine is also referred to as RuleBase. More details of authoring and RuleBase are discussed below.

Figure 2:
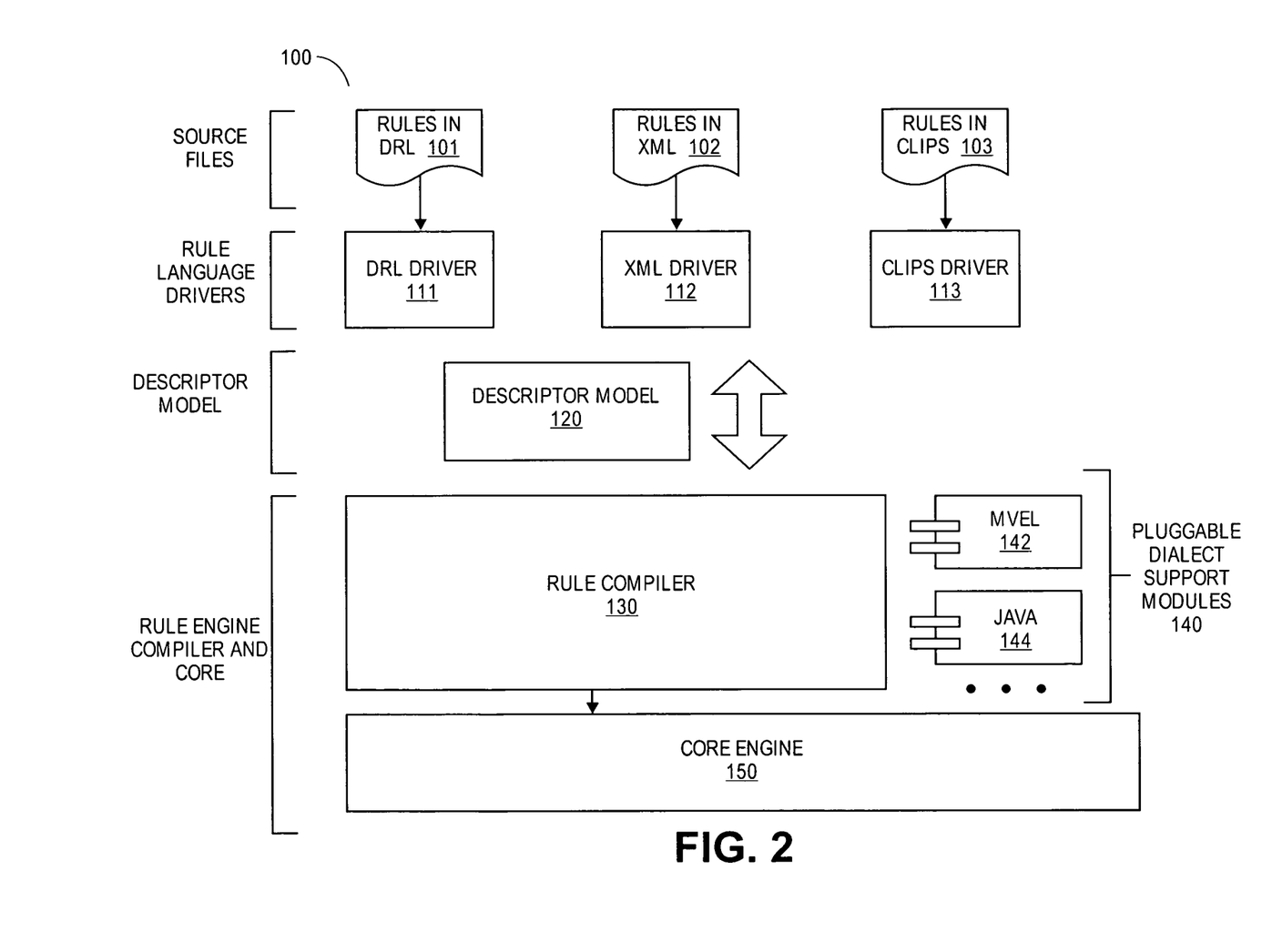
FIG. 2 illustrates the architecture of one embodiment of a rule engine.

As mentioned above, authoring involves the preprocessing of rule files. FIG. 2 shows an architecture of one embodiment of a rule engine usable in authoring. The rule engine 100 includes a DRL driver 111, an XML driver 112, a CLIPS driver 113, a descriptor model 120, a rule compiler 130, a number of pluggable dialect support modules 140, and a core engine of the rule engine (hereinafter, the rule engine core) 150. Rule files written in different rule languages may be parsed by the corresponding rule language drivers. For instance, the rule file in DRL 101, the rule file in XML 102, and the rule file in CLIPS 103 are parsed by the DRL driver 111, the XML driver 112, and the CLIPS driver 113, respectively. The CLIPS driver 113, the XML driver 112, and the DRL driver 111 are merely some examples of the rule language drivers. It should be apparent that other embodiments may include other types of rule language drivers. Further, the rule engine 100 is extensible to support other types of rule languages by adding the corresponding rule language drivers.

Beneath the rule language drivers 110, 112, and 113 sits the descriptor model 120. The descriptor model 120 acts as an interface between the rule compiler 130 and the rule language drivers 111, 112, and 113. The descriptor model 120 contains a set of predefined descriptor classes, like RuleDescr, ConditionalElementDescr, ConstraintDescr, etc., which are used to model concepts that can be expressed in the rule engine 100.

In some embodiments, a parsed rule file is input to the rule compiler 130, which is coupled to a set of pluggable dialect support modules 140. Some examples of the pluggable dialect support modules 140 include a MVEL support module 142 and a Java support module 144. The dialect support modules 140 are "pluggable" because these modules 140 are implemented using plug-in points or extension points, which also make the mechanism extensible. In some embodiments, both static and dynamic addition and configuration of dialects are allowed. There are main interfaces and several auxiliary interfaces that are implemented by a dialect plug-in. A first main interface is DialectConfiguration, which defines and implements the configuration options for the specific dialect. For instance, a Java dialect allows for the configuration of the compiler compliance level (e.g., 1.4, 1.5, or 1.6). A second main interface is Dialect, which defines and implements the actual dialect functionality, i.e., the means by which the engine 100 may interact with the dialect. For instance, the method getConsequenceBuilder( ) returns an object instance capable of building a consequence block in the target dialect.

Furthermore, some embodiments of the rule engine 100 may not differentiate between compiled and interpreted dialects, and abstracts that through the same interfaces. For instance, Java is a compiled dialect and MVEL may work either in compiled or interpreted mode. The mode used is transparent to the rule engine and to the user writing the rules.

On the side of the rule compiler 130, a DialectRegistry class may be defined for bridging the engine requests for dialects and the available dialect implementations, serving as a dynamic index of dialect. Based on a dialect parameter (e.g., the dialect parameters 1012 and 1022 in FIGS. 1A and 1B, respectively) in each rule in the rule file, the rule compiler 130 selects an appropriate pluggable dialect support module from the set of pluggable dialect support modules 140. For example, if the dialect parameter indicates the dialect used in a semantic code block of the rule is MVEL, then the MVEL support module 142 is selected. Using the selected dialect support module, the rule compiler 130 may compile or interpret the semantic code block embedded within each rule while compiling the rules. As such, the user may use any existing programming language or script language to compose a semantic code block and then plug the semantic code block into a rule as long as a corresponding dialect support module is plugged into the rule engine 100. This approach allows the user to leverage on existing programming languages and/or script languages, and thus, making composition of rules easier for the user.

The compiled rules are then input to the rule engine core 150, which is operable to execute the rules. In some embodiments, the compiled rules are then passed to a PackageBuilder within the rule engine core 150 to produce packages. A package is a self-contained, deployable, and serializable object, having one or more rules. A package may also be referred to as a rule set. A package may declare imports, global variables, functions, and rules. In some embodiments, rules are associated with a namespace via a package keyword.

Figure 3:
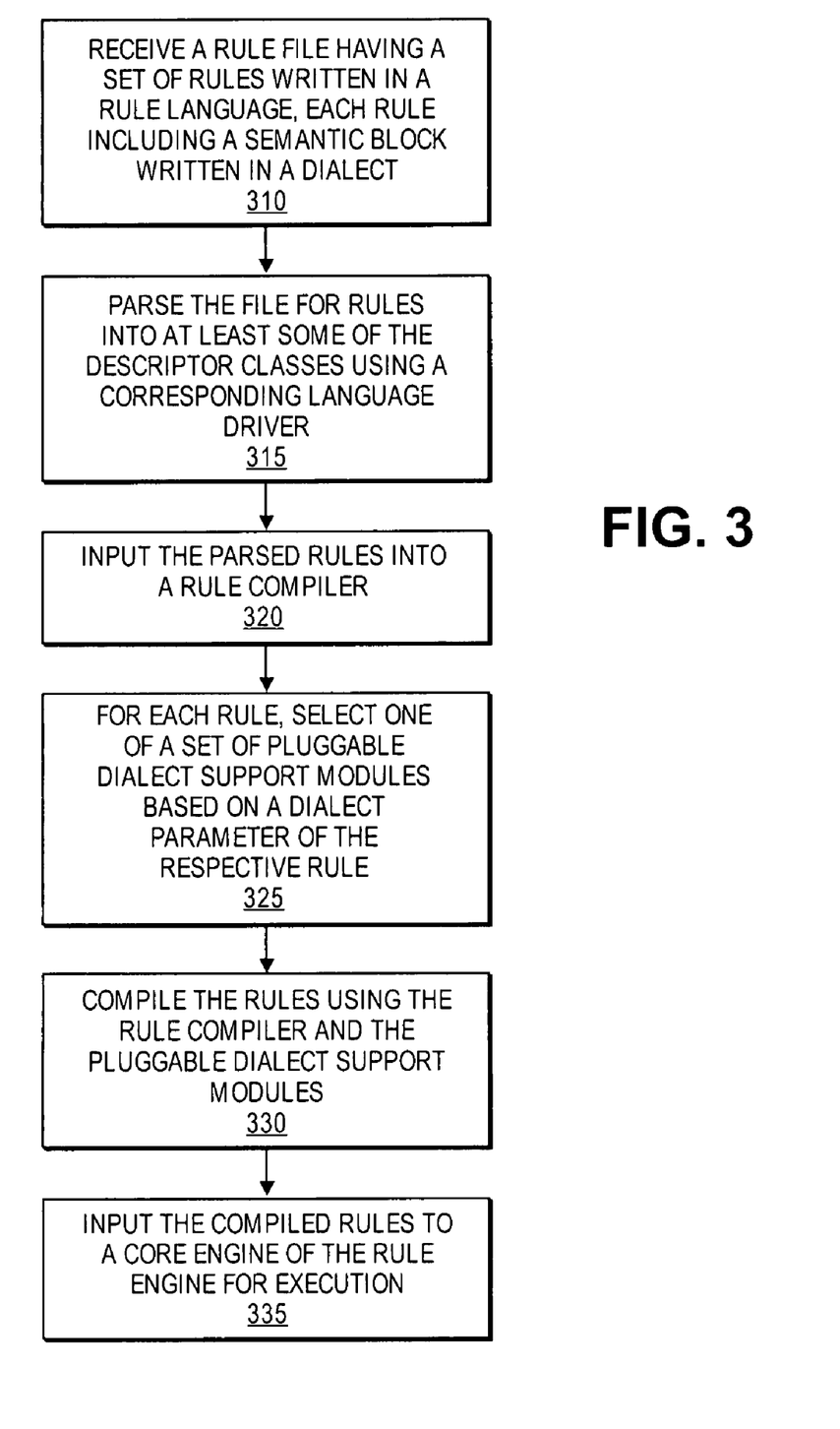
FIG. 3 shows one embodiment of a process to compile rules using pluggable dialects.

FIG. 3 illustrates one embodiment of a process to compile rules using pluggable dialects of a rule engine. The process may be performed by processing logic that may comprise hardware (e.g., circuitry, dedicated logic, programmable logic, microcode, etc.), software (such as instructions run on a processing device), firmware, or a combination thereof. For example, the rule engine 100 in FIG. 2 hosted by the computer system 700 in FIG. 7 may perform at least part of the process in some embodiments.

Referring to FIG. 3, processing logic receives a rule file containing a set of rules written in a rule language (e.g., DRL, XML, etc.) (processing block 310). Each rule may include semantic code blocks written in a dialect (e.g., MVEL, Java, etc.). Processing logic parses the rule file into some descriptor classes provided by a descriptor model (such as the descriptor model 120 shown in FIG. 2) using a corresponding rule language driver (processing block 315). Then processing logic inputs the parsed rules to a rule compiler, such as the rule compiler 130 shown in FIG. 2 (processing block 320).

For each rule, processing logic selects one of a set of pluggable dialect support modules based on a dialect parameter of the respective rule (processing block 325). Then processing logic compiles the parsed rules, including the semantic code blocks within the rules, using the selected pluggable dialect support modules (processing block 330). Finally, processing logic inputs the compiled rules to a core engine of the rule engine for execution (processing block 335).

As mentioned above, a RuleBase is the runtime representation of a rule set. A RuleBase loads one or more packages ready to be used. The rules may have been validated and/or compiled during authoring as described above. In some embodiments, a RuleBase is serializable so it can be deployed to services, such as Java Naming and Directory Interface (JNDI). In some embodiments, a RuleBase is generated and cached on first use in order to save on the continual regeneration of the RuleBase, which is expensive. A RuleBase is instantiated using a RuleBaseFactory. In some embodiments, the RuleBaseFactory returns a Rete Object-Oriented (ReteOO) RuleBase by default. Arguments can be used to specify ReteOO or other RuleBase types. Packages (such as the package 209 in FIG. 2) are loaded into the RuleBase, in turn, using an addPackage method. Packages of any namespace and multiple packages of the same namespace may be added. In some embodiments, packages can be added and removed at any time. All changes may be propagated to the existing working memories. Then fireAllRules( ) may be called to fire the resulting Activations.

In some embodiments, an individual rule cannot be added to a working memory by itself. In order to add an individual rule, a new package containing the individual rule is created and then added to the working memory.

In some embodiments, a RuleBase instance is threadsafe, in the sense that one rule instance may be shared across multiple threads in an application (e.g., a web application). One common operation on a RuleBase is to create a new working memory.

A RuleBase may hold weak references to any working memories that the RuleBase has instantiated. Thus, if rules are changed, added, removed, etc., the rules in the working memory can be updated with the latest rules without having to restart the working memory. Alternatively, a RuleBase may not hold any weak reference to a working memory if the RuleBase cannot be updated.

In some embodiments, a working memory is the main class for using the rule engine at runtime. The working memory holds references to data (i.e., facts) that has been "asserted" into the working memory (until retracted). Further, the working memory is the place where the interaction with the application occurs. Working memories are stateful objects. They may be shortlived, or longlived. If a rule engine is executed in a stateless manner, then a RuleBase object is used to create a new working memory for each session, and the working memory is discarded when the session is finished. Note that creating a working memory is typically a low cost operation. In an alternative approach, a working memory is kept around for a longer time (such as a conversation) and kept updated with new facts. To dispose of a working memory, a dispose( ) method may be used. The dispose( ) method removes the reference from the parent RuleBase. Since this is a weak reference (as discussed above in the section on RuleBase), the reference would eventually be garbage collected. The term working memory action may refer to assertions, retractions, and/or modifications of facts in the working memory.

Assertion broadly refers to the act of telling a working memory about a set of facts. One example to assert a fact, "yourObject," to a working memory is "WorkingMemory.insert(yourObject)." When a fact is asserted in a working memory, the fact is examined for matches against rules in the working memory. Thus, all of the work may be done during assertion; however, in some embodiments, no rules are executed until "fireAllRules( )" is called after asserting the facts.

When a fact is asserted in a working memory, the rule engine returns a FactHandle. This FactHandle is a token used to represent the asserted fact inside the working memory. The FactHandle is also a reference to the fact by which one may interact with the working memory when retracting and/or modifying the fact.

"Retraction" generally refers to causing a rule engine not to track or match a fact previously asserted into a working memory. In other words, when a fact is retracted from the working memory, the rule engine no longer tracks and matches that fact, and any rules that are activated and dependent on that fact may be cancelled. Note that it is possible to have rules that depend on the "non-existence" of a fact, in which case retracting a fact may cause a rule to activate (e.g., rules having the "not" and "exist" keywords). Retraction is done using the FactHandle that has been returned during the assertion.

Modification broadly refers to changing a fact. In general, a rule engine has to be notified of modified facts, so that the modified facts can be re-processed. In some embodiments, a modification includes a retraction followed by an assertion such that the modification clears the working memory and then starts again. One way to perform a modification is to use an update method to notify the working memory of changed objects that are not able to notify the working memory themselves. In some embodiments, update takes the modified object as a second parameter, so that new instances for immutable objects may be specified.

During a single working memory action, multiple rules may become fully matched and eligible for execution. When a rule is fully matched, the rule is activated by creating an activation to reference the rule and the matched facts. Conventionally, activations are placed onto the Agenda, which controls the execution order of these activations using a conflict resolution strategy.

Figure 4:
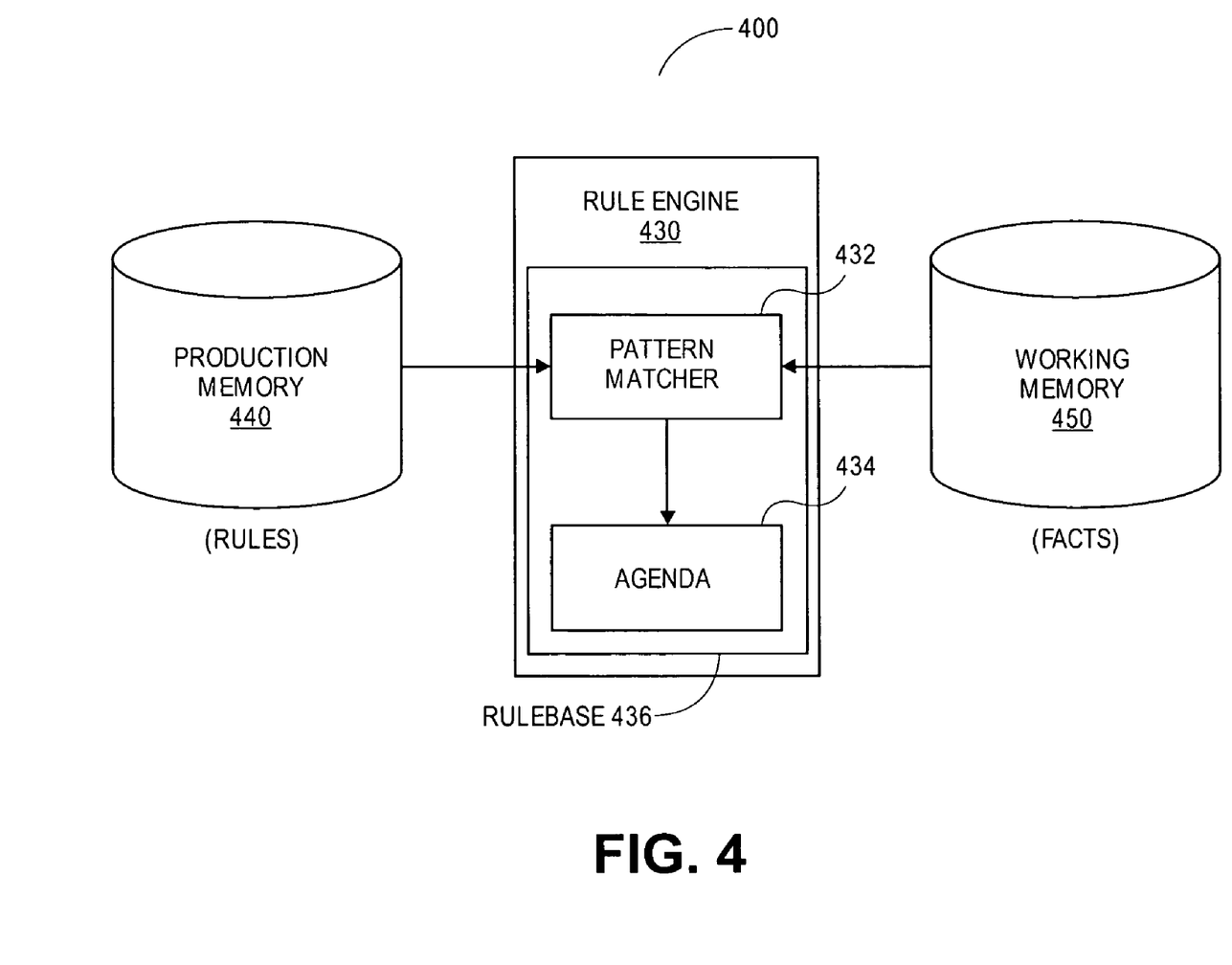
FIG. 4 shows one embodiment of a Production Rule System.

In some embodiments, a production rule system is an expert system adopting a rule-based approach. FIG. 4 illustrates one embodiment of a production rule system. The Production Rule System 400 includes a Rule Engine 430, a Working Memory 450, and a Production Memory 440. The Working Memory 450 stores facts, while the Production Memory 440 stores rules. As discussed above, facts are application data passed from an application as objects (e.g., Java beans) and asserted into the Working Memory 450. After being asserted into the Working Memory 450, the facts are accessible by the rules. In some embodiments, the Rule Engine 430 uses references and/or pointers to access the facts.

The brain of the Production Rules System 400 is the Rule Engine 430, which is scalable to a large number of rules and facts. A runtime of the Rule Engine 430 is a RuleBase 436. The RuleBase 436 includes a Pattern Matcher 432 and an Agenda 434. The Pattern Matcher 430 matches the facts against the rules to infer conclusions, which result in Actions. That is, when the LHS conditions of a rule are satisfied by the facts, the rule and the relevant facts are activated and placed onto the Agenda 434 to be executed.

Figure 5:
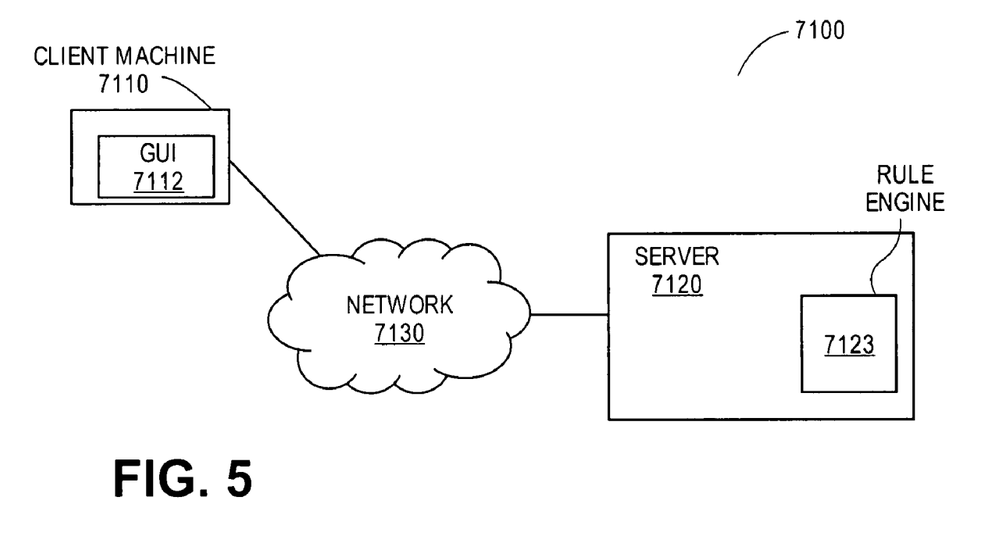
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 having an architecture as illustrated in FIG. 2. The client machine 7110 may present a GUI 7112 (e.g., a web-page rendered by a browser) to allow users to input files for rules, which may be sent to the server 7120 to be processed as discussed above.

Figure 6:
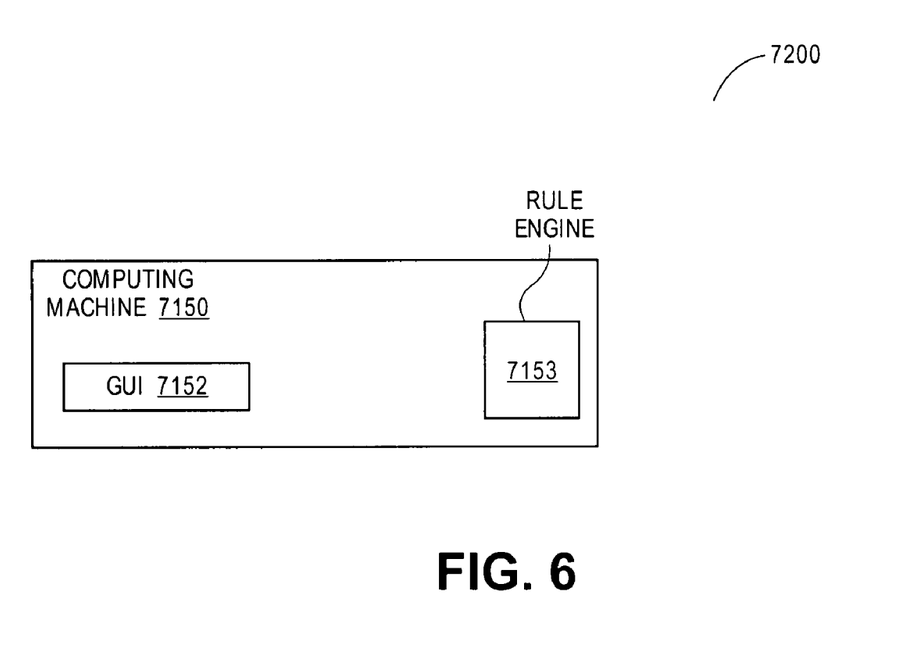
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a rule engine 7153 and a GUI 7152. In some embodiments, users may input rule files using the GUI 7152. Then the files may be processed by rule engine 7153 as discussed above.

Figure 7:
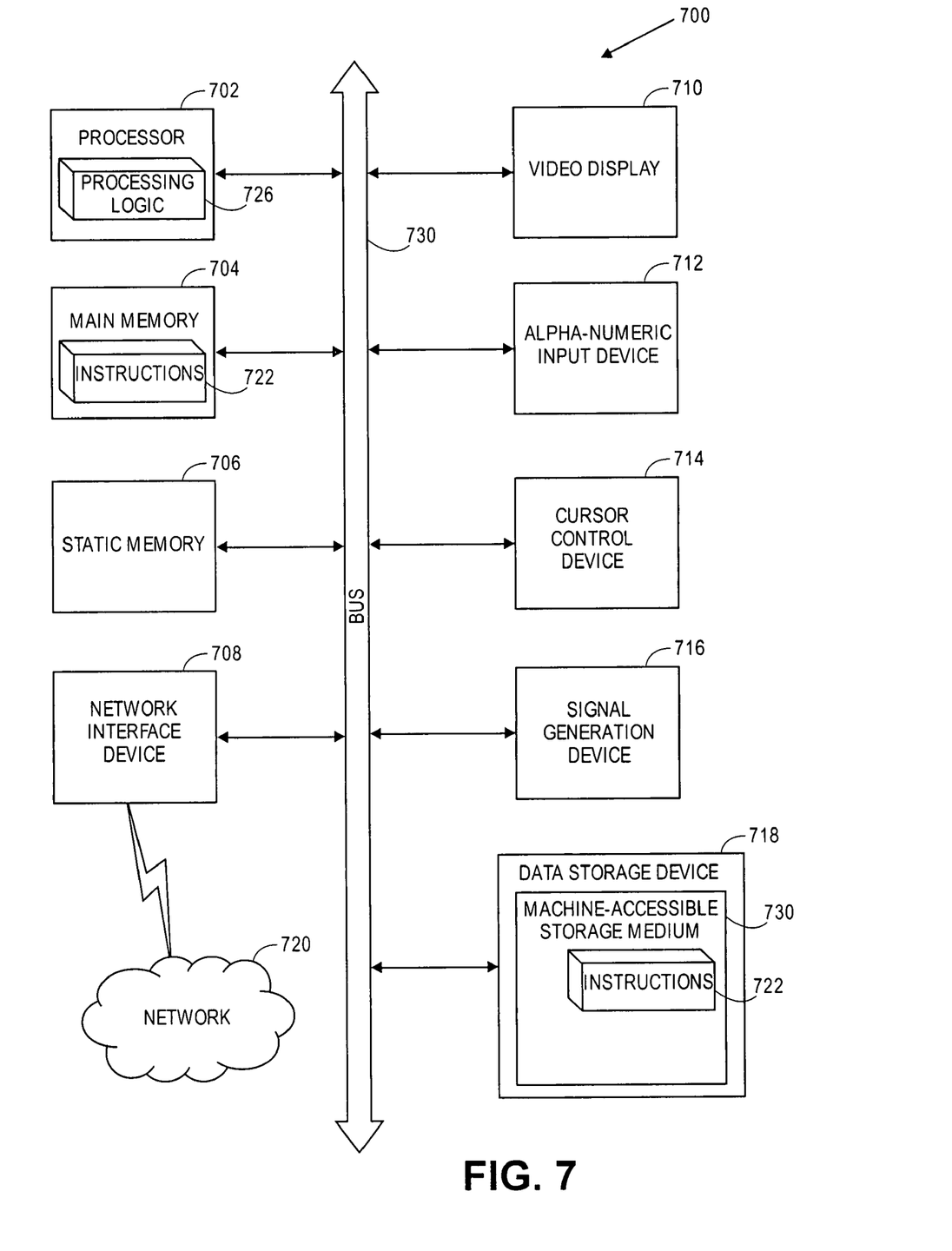
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a machine-readable storage medium) on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of pluggable dialects for a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
  compiling a rule file substantially written in a rule language, the rule file comprising a plurality of rules, each of the plurality of rules including one or more semantic code blocks written in a dialect different from the rule language; and
  inputting the compiled rule file to a core engine of a rule engine for execution, wherein a first rule of the plurality of rules includes a first set of semantic code blocks written in a first dialect and a second rule of the plurality of rules includes a second set of semantic code blocks written in a second dialect different from the first dialect.

2. The method of claim 1, wherein at least one the plurality of rules includes the one or more semantic code blocks as one or more conditional elements of the at least one of the plurality of rules.

3. The method of claim 1, wherein the dialect is Java.

4. The method of claim 1, wherein the rule language is Extensible Markup Language (XML).

5. A computer-implemented method, comprising:
  compiling a rule file partially written in a rule language, the rule file comprising a plurality of rules, each of the plurality of rules including one or more semantic code blocks written in a dialect different from the rule language; and
  inputting the compiled rule file to a core engine of a rule engine for execution, wherein each of the plurality of rules further comprises a dialect parameter indicative of the dialect.

6. A computer-implemented method, comprising:
  compiling a rule file partially written in a rule language, the rule file comprising a plurality of rules, each of the plurality of rules including one or more semantic code blocks written in a dialect different from the rule language;
  inputting the compiled rule file to a core engine of a rule engine for execution; and
  dynamically adding support for one or more dialects to the rule engine.

7. An apparatus comprising:
  a machine-readable storage medium to store instructions; and
  a processing device to retrieve and execute the instructions from the machine-readable storage medium to execute
    a rule compiler operable to compile a rule file substantially written in a rule language, the rule file comprising a plurality of rules, each of the plurality of rules including one or more semantic code blocks written in a dialect different from the rule language,
    a core engine coupled to the rule compiler to receive the compiled rule file and to execute the plurality of rules, and
    one or more pluggable dialect support modules.

8. The apparatus of claim 7, wherein at least one the plurality of rules includes the one or more semantic code blocks as a consequence block of the at least one of the plurality of rules.

9. An apparatus comprising:
  a machine-readable storage medium to store a descriptor model, the descriptor model having a plurality of descriptor classes; and
  a processing device coupled to the machine-readable storage medium to execute
    a rule compiler operable to compile a rule file partially written in a rule language, the rule file comprising a plurality of rules, each of the plurality of rules including one or more semantic code blocks written in a dialect different from the rule language,
    a core engine coupled to the rule compiler to receive the compiled rule file and to execute the plurality of rules, and
    a rule language driver to parse the plurality of rules written into one or more of the plurality of descriptor classes.

10. An apparatus, comprising:
  a machine-readable storage medium to store instructions; and
  a processing device to retrieve and execute the instructions from the machine-readable storage medium to execute
    a rule compiler operable to compile a rule file partially written in a rule language, the rule file comprising a plurality of rules, each of the plurality of rules including one or more semantic code blocks written in a dialect different from the rule language, and
    a core engine coupled to the rule compiler to receive the compiled rule file and to execute the plurality of rules, wherein a first rule of the plurality of rules includes a first set of semantic code blocks written in a first dialect and a second rule of the plurality of rules includes a second set of semantic code blocks written in a second dialect different from the first dialect.

11. An apparatus, comprising:
  a machine-readable storage medium to store instructions; and
  a processing device to retrieve and execute the instructions from the machine-readable storage medium to execute
    a rule compiler operable to compile a rule file partially written in a rule language, the rule file comprising a plurality of rules, each of the plurality of rules including one or more semantic code blocks written in a dialect different from the rule language, and
    a core engine coupled to the rule compiler to receive the compiled rule file and to execute the plurality of rules, wherein each of the plurality of rules further comprises a dialect parameter indicative of the dialect.

12. A machine-readable medium that provides instructions that, if executed by a processor, will cause the processor to perform operations comprising:

compiling a rule file substantially written in a rule language, the rule file comprising a plurality of rules, each of the plurality of rules including one or more semantic code blocks written in a dialect different from the rule language; and inputting the compiled rule file to a core engine of a rule engine for execution wherein a first rule of the plurality of rules includes a first set of semantic code blocks written in a first dialect and a second rule of the plurality of rules includes a second set of semantic code blocks written in a second dialect different from the first dialect.

13. The machine-readable medium of claim 12, wherein at least one the plurality of rules includes the one or more semantic code blocks as one or more conditional elements of the at least one of the plurality of rules.

14. The machine-readable medium of claim 12, wherein the dialect is Java.

15. The machine-readable medium of claim 12, wherein the rule language is Extensible Markup Language (XML).

16. A machine-readable medium that provides instructions that, if executed by a processor, will cause the processor to perform operations comprising:

compiling a rule file partially written in a rule language, the rule file comprising a plurality of rules, each of the plurality of rules including one or more semantic code blocks written in a dialect different from the rule language;

inputting the compiled rule file to a core engine of a rule engine for execution, wherein each of the plurality of rules further comprises a dialect parameter indicative of the dialect.

17. A machine-readable medium that provides instructions that, if executed by a processor, will cause the processor to perform operations comprising:

compiling a rule file partially written in a rule language, the rule file comprising a plurality of rules, each of the plurality of rules including one or more semantic code blocks written in a dialect different from the rule language;

inputting the compiled rule file to a core engine of a rule engine for execution; and dynamically adding support for one or more dialects to the rule engine.

18. A machine-readable storage medium that provides instructions executable by a rule engine running on a processing device, the instructions if executed, will cause the rule engine to perform operations comprising:

compiling a rule file, the rule file including:
at least two rules partially written in a rule language, wherein a first rule of the at least two rules includes a first semantic code block written in a first dialect different from the rule language, and a second rule of the at least two rules includes a second semantic code block written in a second dialect different from the rule language, wherein the first dialect is different from the second dialect; and executing the rule file compiled.

19. The machine-readable storage medium of claim 18, wherein the rule language is Extensible Markup Language (XML), the first dialect is Java, and the second dialect is MVFLEX Expression Language (MVEL).

20. The machine-readable storage medium of claim 18, wherein each of the at least two rules includes a dialect parameter indicative of a dialect used in a respective semantic code block within a respective rule.

* * * * *